Nov. 7, 1933.  E. C. FRITTS  1,933,797

DUPLEX CAMERA CONSTRUCTION

Filed Dec. 20, 1929

Inventor
Edwin C. Fritts

By
W. M. Perrin
Donald H. Stewart
Attorneys

Patented Nov. 7, 1933

1,933,797

UNITED STATES PATENT OFFICE 1,933,797

DUPLEX CAMERA CONSTRUCTION

Edwin C. Fritts, Rochester, N. Y., assignor to Eastman Kodak Company, Rochester, N. Y., a corporation of New York Application December 20, 1929
Serial No. 415,462

9 Claims. (Cl. 88—16.6)

This invention relates to photography and more particularly for duplex photographic cameras adapted to make two sets of negatives simultaneously. One object of my invention is to provide a camera from which exposed film can be removed without fogging unexposed film remaining in the camera. Another object of my invention is to provide a camera with supply and take-up chambers with suitable covers adapted to protect film in these chambers and adapted to expose a chamber from which film is to be removed. Another object of my invention is to provide covers to protect the films from light and means for operating the covers from the exterior of the camera casing. Other objects will appear from the following specification, these features being particularly pointed out in the claims at the end thereof.

While certain features of my invention are adapted for use on other types of cameras, my invention is particularly directed to a camera of the type shown in U. S. Patent 1,730,930, Fritts, issued October 8, 1928. Reference may be had to this patent for details of the film-driving and exposing mechanism which are not important in the present invention.

Coming now to the drawing, wherein like reference characters denote like parts throughout:—

The camera shown in the accompanying drawing is particularly adapted for use with document photographing machines such as machines which photograph checks and I have shown a camera of this type equipped with the covers constructed in accordance with my invention.

For such purposes it is customary to provide a camera which will make a number of exposures consecutively on a plurality of films so that several records are made.

Figure 1:
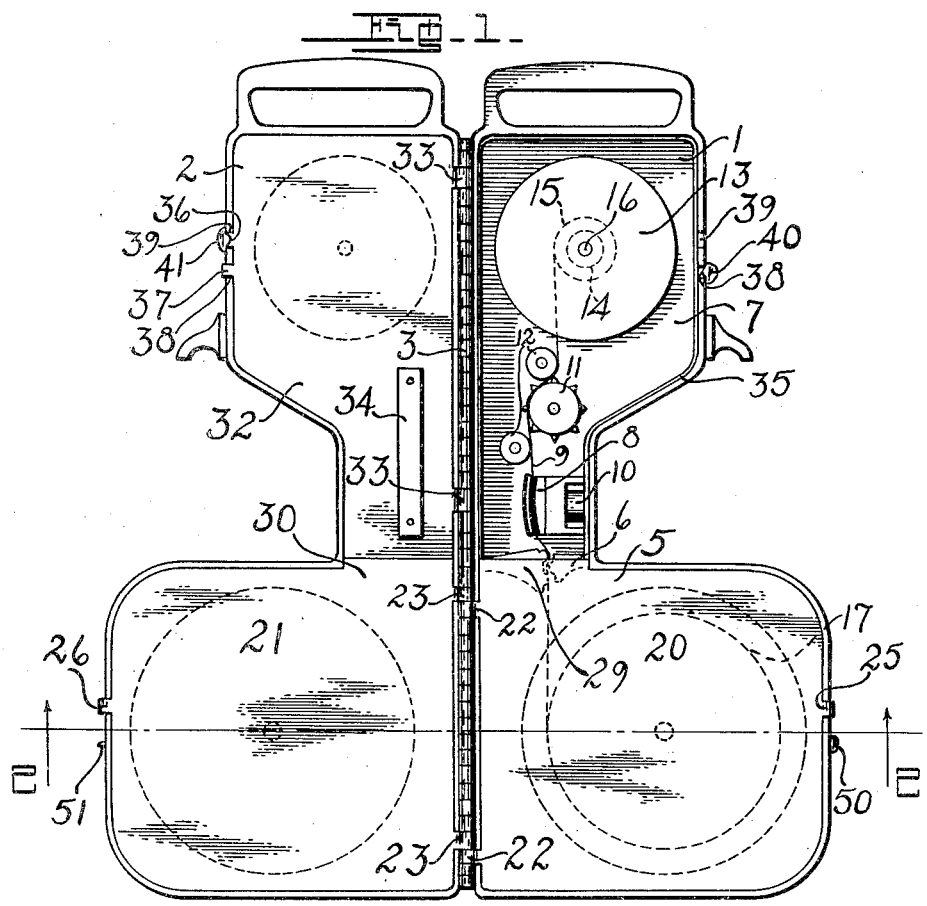
Fig. 1 is a top plan view of a camera provided with safety covers in accordance with and embodying a preferred form of my invention.
Figure 2:
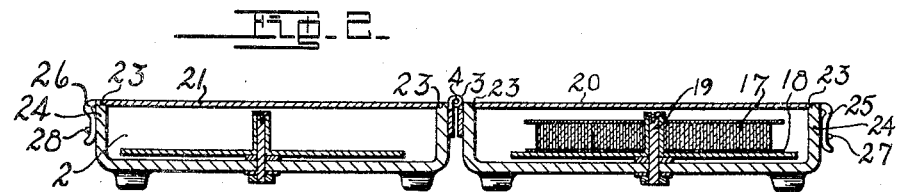
Fig. 2 is a section on line 2—2 of Fig. 1.

In the herein described embodiment a duplex camera is shown as consisting of a camera casing composed of sections 1 and 2 hinged together at 3 upon a hinged pintle 4 best shown in Fig. 2. Each of these sections might be considered a camera in itself since it consists broadly of a supply chamber 5, a partition wall 6 and a take-up chamber 7. Since these parts of each section are alike only one set of reference characters will be used.

In each take-up chamber 7 there is a gate 8 through which a film 9 may be internally moved past an objective 10 by means of a sprocket 11 which may be intermittently driven, the film being held on the sprocket by means of idlers 12.

If preferred the film-moving mechanism fully shown and illustrated in the patent above referred to may be employed for the purposes of the present invention. It is immaterial how or by what mechanism the film is moved.

The film passes to a take-up reel 13 having a core 14 on which convolutions 15 of film may be wound. This reel 13 is supported on a power-driven take-up shaft 16 which winds the film as exposures are made.

With this type of apparatus it is common practice to furnish coils 17 of unexposed film which may be placed on a disc 18 mounted to turn freely upon a central post 19. These reels of film are quite large and it frequently happens that as a small amount of film has been used it is desirable to remove such film for development. Accordingly the film may be cut above the partition 6 and the film coiled upon the reel 13 may be removed for fluid treatment.

As this operation is generally carried out in a dark room it is necessary to provide a structure which can be readily operated in the dark without difficulty. Since both camera sections have light-sensitive film therein, the film, with the exception of that to be removed, should be protected during the removal of the exposed film particularly in case where a film is removed in a semi-dark place by coiling a protective covering between the flanges of the reel 13 before it is removed from the camera.

It is desirable to provide cover plates which lie wholly within the duplex camera when the camera sections are closed and to provide a means for latching at least one of these sections to one of the camera sections from the outside of the camera.

Accordingly the supply chambers 5 may be provided with similar cover plates 20 and 21, each hinged at 22 and 23 to the hinged pintle which unites the camera sections.

Figure 4:
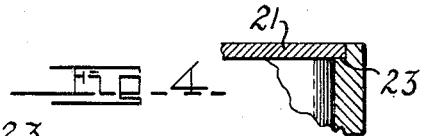
Fig. 4 is an enlarged detail through a portion of a rabbetted wall and cover-plate used in the camera shown in Fig. 1.

As best shown in Figs. 2 and 4 the cover plates 20 and 21 fit into rabbets 23 which extend around the peripheries of the supply chambers so that the cover plates normally lie flush with the top of the edge walls 24 of these sections. Each cover plate 20 and 21 is provided with a spring arm 25 and 26 adapted to engage pins 27 and 28 on the outside walls of the camera. These latches serve to hold the cover plates closed.

Figure 3:
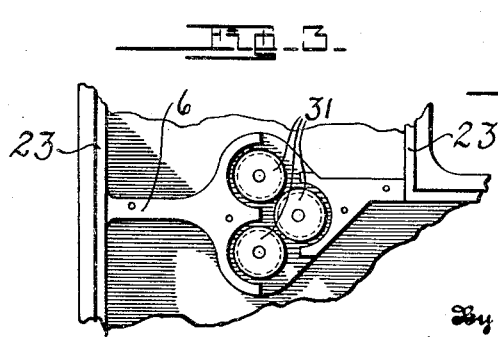
Fig. 3 is an enlarged detail in elevation of a partition wall and light trap therein.

The upper edges 29 and 30 of the cover plates 20 and 21 lie on top of the partition walls 6 which as best shown in Fig. 3 comprises flat-topped walls having a tortuous channel formed through a series of guide rollers 31. These guide rollers are arranged in such relation that a film passing through rollers forms a substantially light-tight joint between the take-up and supply chambers of the camera sections.

The take-up camera chambers are provided with a single cover plate 32 which is hinged at 33 to the hinged pintle 4 and which is adapted to lie in rabbets 35 which extend around walls of each of the take-up chambers.

When the duplex camera is closed the cover plate 32 engages both sets of rabbets lying between the two take-up chambers and providing a means for holding the film in each chamber in position on the sprockets 11 behind the idlers 12 and which also holds the film reels 13 on their respective shafts 14. The cover plate 32 may be provided with raised bars 34 to lie over the film 9 and to hold the film in gate 8 and these bars may be either separate pieces attached to the cover or formings may be made in the cover.

The cover plate 32 is provided with a pair of lugs 36 and 37 adapted to extend out through slots 38 and 39 in the walls of the camera sections.

Latches 40 and 41 are fastened to the outside walls of the camera sections in spaced relation, the spacing being determined by the spacing of the lugs 36 and 37. One latch is adapted to engage one of the lugs, latch 40 being adapted to engage lugs 37 and latch 41 being adapted to engage lug 36. When the camera is closed both lugs are engaged and the two latches hold the camera sections together.

When, however, film is to be removed from one take-up chamber the proper latch is released to retain the cover 32 in substantially light-tight relation with the opposite take-up section. Of course if both exposed film reels are to be removed both latches can be released and the cover plate 32 may be swung between the two sections thus the cover plate may be made to cover one of the take-up film chambers or may be made to expose both of them when the duplex camera is opened.

The cover plate forms the sole member for holding the upper part of the duplex camera sections together, the lower part of the duplex camera sections being held together by means of a spring latch 50 which may be engaged with a pin 51 to hold these parts together.

The lower covers 20 and 21 are normally held in position by means of their latch structures above described.

The operation of the duplex camera is as follows: with film loaded about the posts 19 and properly threaded through the camera into the take-up reels. The camera may be made to operate and make the desired records until such a time as it may be necessary to remove exposed film. If the film is to be removed from one side only the camera may be opened by release catches 50 and one of the two spring catches 40 or 41 according to which take-up chamber is to be exposed. The film can be removed and rethreaded if desired without any danger of fogging either the film remaining in the opposite take-up chamber or in the supply chambers.

As above described this operation will usually take place in a dark or semi-dark room and the connection between the cover plates and the camera sections is such that a substantially light-tight joint is made between these parts. By substantially light-tight I mean a joint which is not necessarily effective to prevent the entrance of light if the camera were operated in direct sunshine but only an effective light-tight joint to prevent undesirable light from entering when the camera is opened under the normal conditions of operation.

Having thus described my invention, what I claim as new and desire to secure by Letters Patent is:

1. In a duplex camera, the combination with a camera casing composed of sections adapted to contain light senstive strip material and advancing mechanism therefor, of partitions in each section dividing it into supply and take-up chambers for the strip material, a cover for each supply chamber, a single cover between the take-up chambers and means for swingably connecting said covers between and to the casing sections.

2. In a film container, the combination with a casing composed of sections adapted to contain photographic strip material, of partitions in each section dividing it into opposite pairs of supply and take-up chambers for the strip material, an individual cover for each of one pair of opposite chambers, a cover common to the other pair of opposite chambers and means for swingably connecting said covers between and to the casing sections.

3. In a duplex camera, the combination with a camera casing composed of sections adapted to contain light sensitive strip material and advancing mechanism therefor including supply and take-up reels, of partitions in each section dividing them into supply and take-up chambers adapted to receive the supply and take-up reels, respectively, a cover for each supply chamber, a single cover between the take-up chambers, the adjacent edges of said covers being adapted to abut said partitons in light-tight relation, and means for swingably connecting said covers between and to the casing sections.

4. In a duplex camera, the combination with a camera casing composed of sections adapted to contain light sensitive strip material and advancing mechanism therefor, of partitions in each section dividing it into supply and take-up chambers for the strip material, a cover for each supply chamber, a single cover between the take-up chambers, means for swingably connecting said covers between and to the casing sections and substantially light-tight connections between the covers and the partitions.

5. In a duplex camera, the combination with a camera casing composed of sections adapted to contain light sensitive strip material and advancing mechanism therefor, of partitions in each section dividing it into supply and take-up chambers for the strip material, said advancing mechanism including a sprocket, idlers and gate within each take-up chamber, a cover for each supply chamber, a single cover between the take-up chambers having projections thereon adapted to guide the strip material through said gate and over said sprocket when moved into engagement with one or both casing sections and means for swingably connecting both of said covers to and between said casing sections.

6. In a duplex camera, the combination with a camera casing composed of sections adapted to contain light sensitive strip material and advancing mechanism therefor including supply and take-up reels, of partitions in each section dividing it into supply and take-up chambers for the strip material and adapted to receive the respective reels, a cover for each supply section, a single cover between the take-up chambers, means for swingably connecting said covers to and between said casing sections and fastening means for said covers including latches on each casing section adapted to engage the cover for the take-up chambers and latches on the supply chamber covers adapted to engage said casing sections whereby all the covers may be maintained in light-tight relation to said casing sections.

7. In a duplex camera, the combination with a camera casing composed of sections adapted to contain light sensitive strip material and advancing mechanism therefor including supply and take-up reels, of partitions in each section dividing it into supply and take-up chambers for the strip material and adapted to receive the respective reels, a cover for each supply section, a single cover between the take-up chambers, means for swingably connecting said covers to and between said casing sections and latches on each casing section adapted to engage the cover for the take-up chambers, one of which is operated to open the casing sections and expose only one take-up chamber.

8. In a film container, the combination with a casing composed of hinged sections each adapted to receive light-sensitive photographic material, of partitions dividing each section into two separate light-tight chambers, a cover adapted to make a light-tight connection with either of two of the above-mentioned chambers, and a separate cover for each of the remaining chambers whereby the several chambers may be made individually light-tight when the casing is opened upon its hinge.

9. In a film container, the combination with a casing composed of two sections, a hinge supporting the two sections on which they may move to and from each other, said sections being adapted to receive light-sensitive photographic material, of partitions dividing each section into two separate parts, a cover adapted to make a light-tight connection with either of two of the above-mentioned chambers, said cover being supported upon the said hinge, and a separate cover also supported upon said hinge for each of the remaining chambers whereby three of the four chambers may be made light-tight when the casing is opened by swinging one section relative to the other upon its hinge.

EDWIN C. FRITTS.